United States Patent [19]
Hedman

[11] Patent Number: 5,779,280
[45] Date of Patent: Jul. 14, 1998

[54] FLUID CONNECTOR

[75] Inventor: Erik Hedman, Linkoping, Sweden

[73] Assignee: Mark IV Automotive Aktiebolag, Solvesborg, Sweden

[21] Appl. No.: 810,614

[22] Filed: Feb. 28, 1997

[51] Int. Cl.[6] ..................................................... F16L 39/00
[52] U.S. Cl. ........................................ 285/124.4; 285/184
[58] Field of Search ............................... 285/142.1, 184, 285/124.3, 124.4

[56] References Cited

U.S. PATENT DOCUMENTS 2,926,935  3/1960  Marre ........................................ 285/184
3,545,793  12/1970  Graffy ...................................... 285/142.1
3,869,152  3/1975  DeVincent et al. ..................... 285/124.3
5,071,172  12/1991  Gross ....................................... 285/124.4

Primary Examiner—Dave W. Arola
Attorney, Agent, or Firm—Baker & Daniels

[57] ABSTRACT

A fluid connector for connecting to a fluid carrying aperture and an apparatus. A connector includes a fluid conduit having a base. A yoke secures the base to an apparatus by means of a fastener. A seal is provided between the base and the apparatus for sealing engagement of the connector to the apparatus. When the fastener is loosened, the connector can be rotated to orient the conduit as desired.

6 Claims, 3 Drawing Sheets

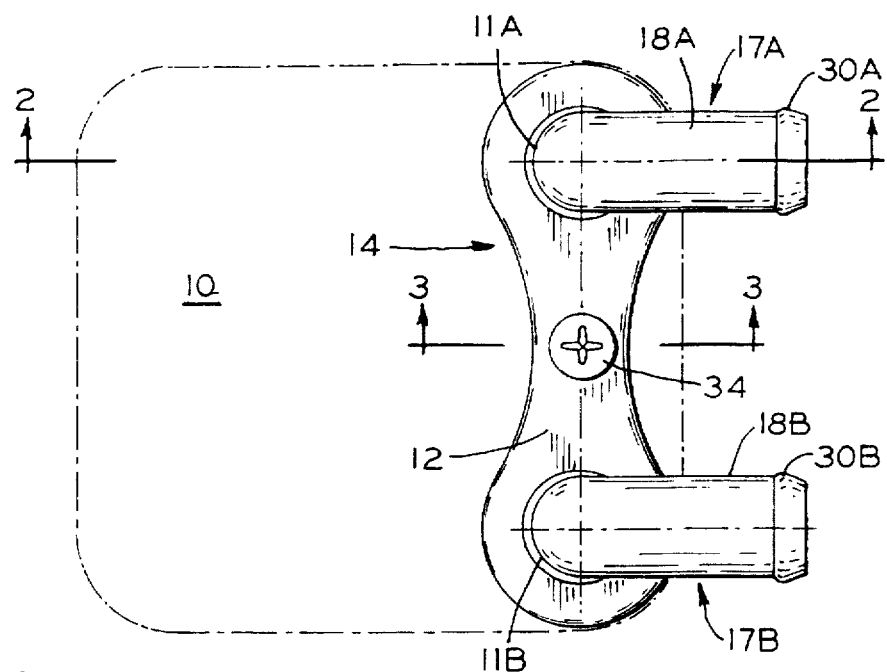
FIG_1
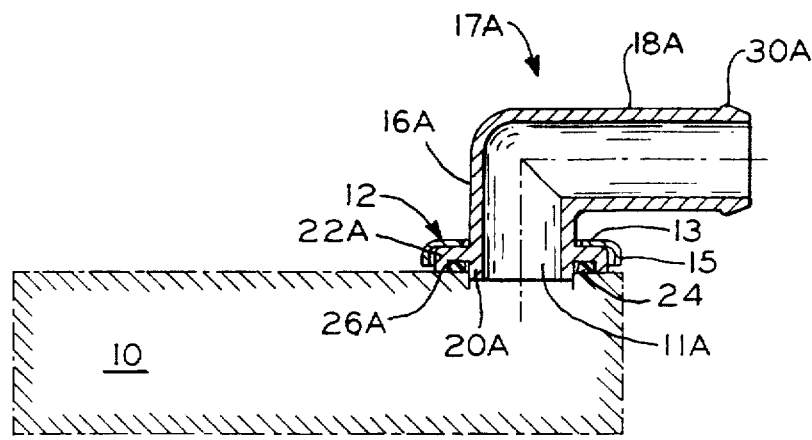
FIG_2
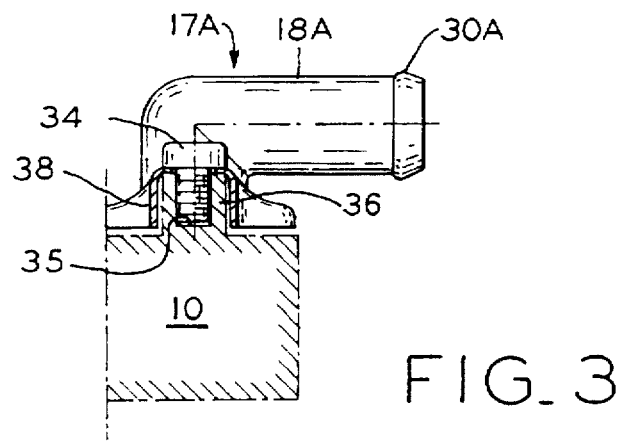
FIG_3

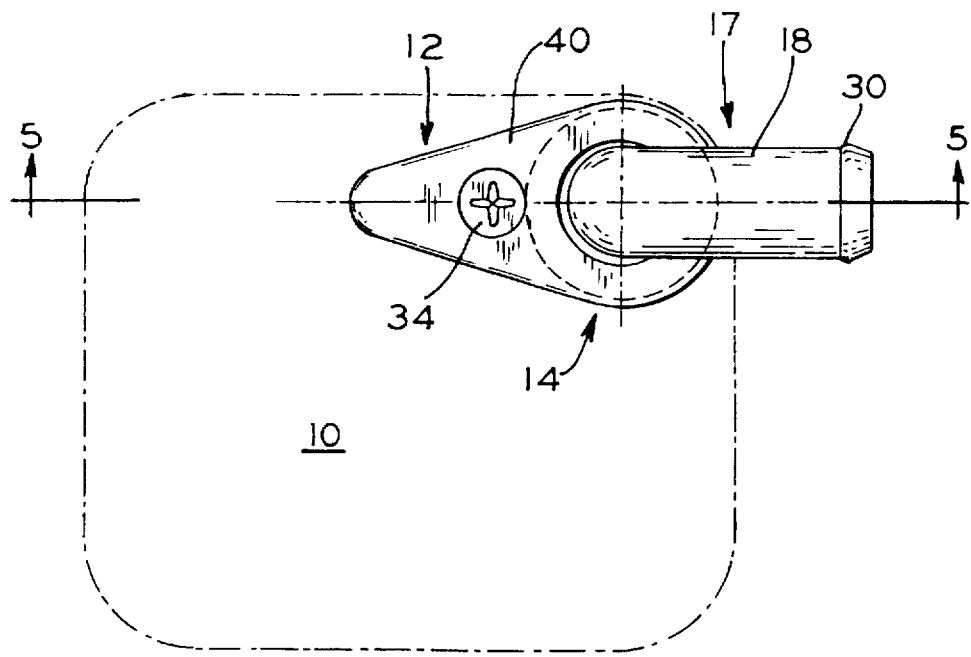
FIG_4
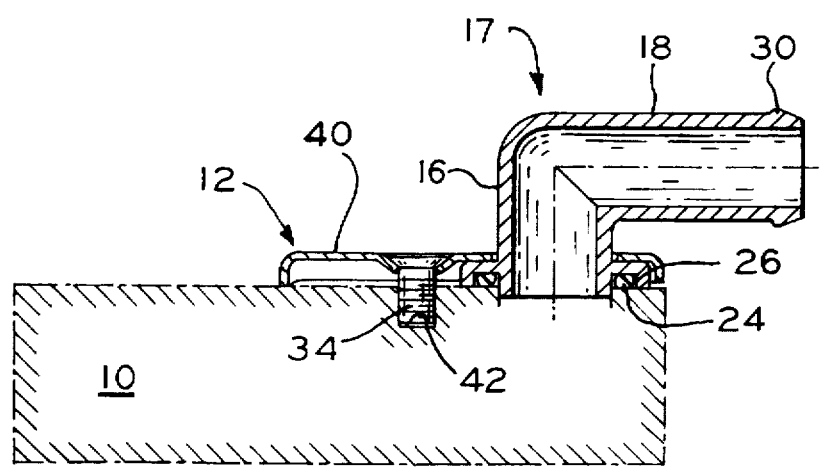
FIG_5

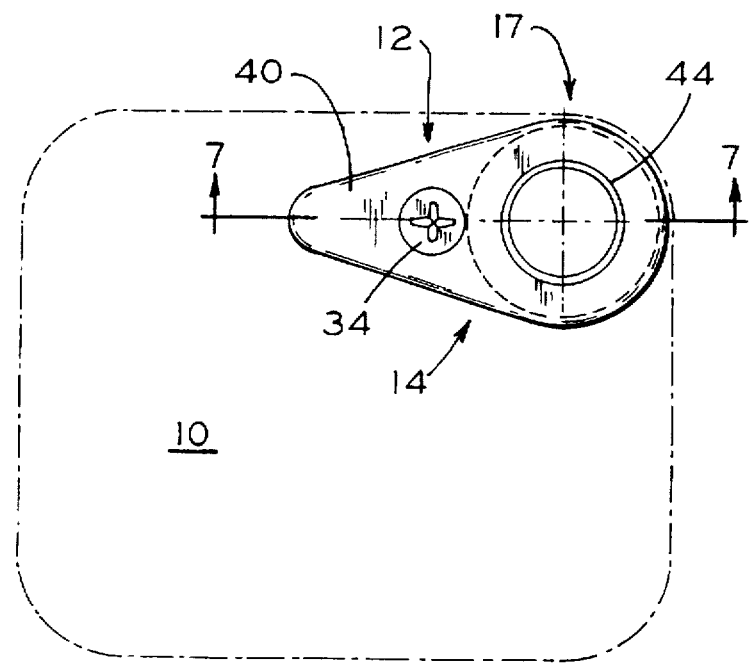
FIG_6
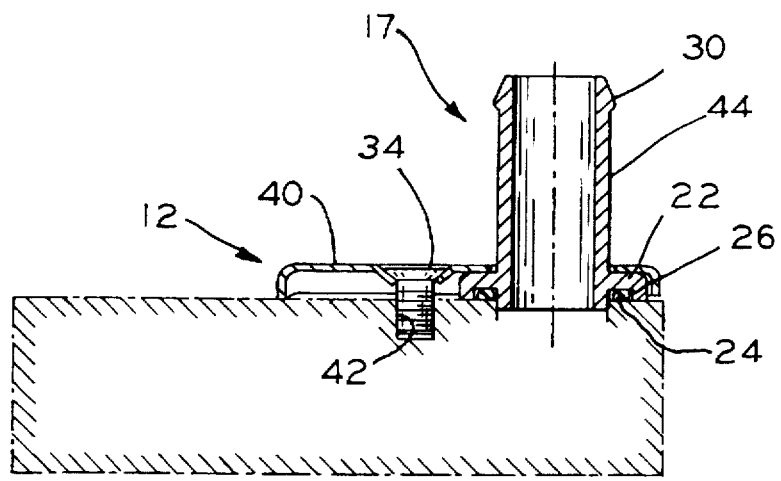
FIG_7

FLUID CONNECTOR

BACKGROUND OF THE INVENTION

This invention relates to a connector for making fluid connections to an apparatus. For instance, certain apparatuses must be connected to a source of fluid, such as a liquid, and include a fluid input aperture. Other apparatuses need to be connected to a fluid exit aperture. Still other apparatuses include fluid input and output apertures, for instance apertures to effect the cooling of an apparatus by circulating of cooling fluid. Many times, when such connections are made to an apparatus, the fluid connector includes an angled section whereby the fluid changes direction as it travels to the apparatus. Commonly, such connectors comprise an elbow element which includes two sections which are angled with respect to each other by 90°, although instead of two sections a single straight section could be used. Conventionally, such connectors are secured to an apparatus by means of welding, brazing, soldering, threading or the like. With such connectors, the angle of orientation of the connector to the apparatus is fixed, i.e. is not adjustable. Many times, due to spatial considerations, the orientation angle is incorrect for servicing of the apparatus or for spatial considerations. This creates problems both in installing the apparatus and making the connections to the apparatus as well as in servicing the apparatus.

Another problem which exists in the prior art is that, when connectors are vacuum brazed, for instance in oil coolers which have fixed connectors, the vacuum oven can only be filled up to 60%, which is quite inefficient.

It is therefore desired to provide a fluid connector wherein the angled section of the fluid connector can be rotated relative to the apparatus to provide the proper orientation while providing a proper seal connection to the apparatus. It is also desired that a connector may be assembled to an apparatus after construction of the apparatus by brazing and the like.

SUMMARY OF THE INVENTION

The connector according to the present invention includes an angled fluid conduit which has a base. A yoke cooperates with the base to secure the fluid conduit to an apparatus. The connector also includes a seal for sealing the connector to the apparatus. When the fastener is loosened, the fluid conduit can be rotated to any desired orientation after which the fastener can be refastened to sealingly engage the fluid connector to the apparatus.

A fluid connector for connecting to a fluid carrying aperture of an apparatus. The connector comprises a fluid conduit which has first and second interconnected sections. The sections are oriented at an angle, equal to or less than 180°, with respect to each other whereby fluid flowing through the conduit changes direction. The first section includes a base which is configured to be engaged in fluid carrying communication with the fluid carrying aperture in the apparatus. The base includes a seal chamber which houses a seal. A yoke secures the base into sealing engagement with an apparatus by means of a fastener whereby the second section of the conduit can be oriented with respect to the apparatus.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 1 is a top plan view of the connector according to the present invention.

FIG. 2 is a cross-sectional view of the connector taken along lines 2—2 of FIG.

FIG. 3 is a partial, cross-sectional view of the connector taken along lines 3—3 of FIG. 1.

FIG. 4 is a plan view of a second embodiment of the connector according to the present invention.

FIG. 5 is a cross-sectional view of the connector of FIG. 4 taken along lines 5—5.

FIG. 6 is a plan view of a third embodiment of the connector according to the present invention;

FIG. 7 is a cross-sectional view of the connector of FIG. 6 taken along lines 7—7.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE PREFERRED EMBODIMENT

Referring to FIGS. 1–3, a connector 14 is illustrated. Connector 14 includes a yoke 12 and two identical fluid carrying conduits 17A and 17B. The conduits each include sections 16 and 18. The connectors are secured to an apparatus 10 which includes two fluid ports 11A and 11B. Section 16A of conduit 17A is connected in fluid flow relationship with port 11A. For the particular apparatus 10 shown, port 11A could be a fluid inlet and port 11B a fluid output. For instance, in an apparatus which is fluid cooled, ports 11A and 11B could be used as a fluid inlet port and a fluid outlet port.

Conduit 17A includes a base 22A secured to section 16A, closely adjacent end 20A of section 16A. A chamber 26A is provided in base 22A for housing a seal such as an O-ring seal 26A. It can also be seen that section 18A of connector 14 includes a ridge 30A as is customary in order that section 18A may be connected to a flexible hose which may be made of plastic or rubber.

Yoke 12 includes a surface 13 and a flange 15. The yoke fits over bases 22A and 22B of conduits 17A and 17B. As can also be seen from FIG. 3, apparatus 10 includes an upstanding spacer section 36 which is also covered by a flanged portion 38 of yoke 12. Yoke 12 includes an aperture for accommodating a fastener 34. Section 36 includes an aperture 35 whereby fastener 34 can be threaded into aperture 35.

In operation, before fastener 34 is secured, conduits 17A and 17B are oriented so that sections 18A and 18B can be rotated as desired for ease of installation and servicing of apparatus 10. Once the orientations of conduits 17A and 17B have been selected, fastener 34 is secured whereby yoke 12 is drawn toward the top surface of apparatus 10, thereby compressing seals 26A and 26B for a fluid tight engagement of conduit 17A with apparatus 10. Similarly, a seal is provided for conduit 17B which is also compressed by the securement of fastener 34. The yoke has to take up the forces from the fluid pressure in connectors 14A and 14B. Furthermore, the compression of seals 26A and 26B must be sufficient to create the proper stress for the O-rings. This can be accomplished by the proper dimensioning of yoke 12 and conduits 17A and 17B as well as spacer section 36.

It should be noted that instead of providing a spacer section 36 as shown in FIG. 3, yoke 12 could be provided with an upstanding section for engagement with the top surface of apparatus 10 and apparatus 10 could include a matching aperture to cooperate with the threaded fastener.

Referring now to FIGS. 4 and 5, a second embodiment of the invention is shown. In this embodiment only a single conduit is secured by means of a yoke 40. One end of yoke 40 is supported directly by the apparatus whereas the other end of yoke 40 is supported by the base of conduit 17. In this arrangement apparatus 10 includes an aperture 42 for cooperating with the fastener 34.

In the disclosed embodiments, the angle of orientation of section 18A relative to section 16A of conduit 17 is 9020. However, alternate arrangements are possible as understood by those skilled in the art.

Additionally, other sealing arrangements could be used than the O-ring arrangement as disclosed herein.

Referring now to FIGS. 6 and 7, an alternative embodiment is shown. In this embodiment conduit 17 includes only a single section 44 which is straight. The arrangement for sealing connector 14 to apparatus 10 is identical to that disclosed in FIGS. 4 and 5. In connection with FIGS. 6 and 7 the advantage of the invention is that the method of connecting and sealing connector 14 to apparatus 10 is very simple.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A fluid connector for connecting a conduit to a fluid carrying aperture of an apparatus, said connector comprising:

a fluid conduit, said fluid conduit comprising first and second interconnected sections, said sections oriented at an angle with respect to each other which is less than 180°, whereby fluid flowing through said conduit changes direction;

said first section including a base, said base adapted to be engaged in fluid carrying communication with said aperture of said apparatus, said base having a seal chamber;

a seal disposed in said seal chamber;

a yoke for securing said base into sealing engagement with said apparatus; and a single only fastener for securing said yoke to a said apparatus, whereby said conduit is rotatable adjustable with respect to said apparatus upon loosening said fastener.

2. The connector according to claim 1 and including a plurality of fluid conduits, each said conduit including a base, whereby said fluid conduits are individually adjustable with respect to said apparatus.

3. The apparatus according to claim 2 wherein said connector is adapted to connect to respective inlet and outlet apertures in a said apparatus.

4. The apparatus according to claim 2 wherein said fastener is located between said conduits.

5. A fluid connector comprising:

a fluid conduit defining an elbow;

said fluid conduit including a base, said base including a seal chamber;

a seal disposed in said seal chamber;

a yoke element operatively associated with said elbow for securing said elbow to an apparatus;

a single only fastener for securing said yoke, whereby said elbow can be rotated before said yoke is secured to an apparatus; and said conduit is detachable from each of said yoke and said apparatus upon loosening and removing said fastener.

6. A fluid connector for connecting conduits to a fluid carrying apertures of an apparatus, said connector comprising:

a plurality of fluid conduits, each said fluid conduit including a base, each said base adapted to be engaged in fluid carrying communication with a one of said apertures of a said apparatus, each said base having a seal chamber;

a seal disposed in each said seal chamber;

a yoke for securing each said conduit into sealing engagement with said apparatus; and a fastener positioned between said conduits for securing said yoke to said apparatus, whereby each said fluid conduit can be independently rotatably adjusted with respect to said apparatus upon loosening said fastener.

* * * * *